US009565232B2

(12) United States Patent
Chen

(10) Patent No.: US 9,565,232 B2
(45) Date of Patent: Feb. 7, 2017

(54) IMPORTING CONTENT ITEMS

(71) Applicant: Dropbox, Inc., San Francisco, CA (US)

(72) Inventor: Alicia Chen, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 174 days.

(21) Appl. No.: 14/042,280

(22) Filed: Sep. 30, 2013

(65) Prior Publication Data

US 2014/0330776 A1 Nov. 6, 2014

Related U.S. Application Data

(60) Provisional application No. 61/819,338, filed on May 3, 2013.

(51) Int. Cl.
*G06F 17/30* (2006.01)
*H04L 29/08* (2006.01)

(52) U.S. Cl.
CPC ......... *H04L 67/00* (2013.01); *G06F 17/30176* (2013.01); *H04L 67/02* (2013.01); *H04L 67/1095* (2013.01); *H04L 67/2842* (2013.01)

(58) Field of Classification Search
CPC .................................................. G06F 17/30174

USPC ......................................................... 707/610
See application file for complete search history.

(56) References Cited

U.S. PATENT DOCUMENTS

| 2006/0070062 | A1* | 3/2006 | Cox et al. ...................... 717/174 |
| 2010/0185698 | A1* | 7/2010 | Lee et al. ....................... 707/803 |
| 2013/0205219 | A1* | 8/2013 | Moha et al. .................... 715/748 |
| 2013/0282830 | A1* | 10/2013 | Besen et al. ................... 709/205 |
| 2014/0282938 | A1* | 9/2014 | Moisa ................................ 726/6 |

* cited by examiner

*Primary Examiner* — Alexey Shmatov
(74) *Attorney, Agent, or Firm* — Polsinelli PC

(57) ABSTRACT

Content items stored on a client device can be imported to a content management system. The client device can be configured to search on the client device for specified file extensions to identify content items to be imported. The search can be of the entire memory, or alternatively, locations known to likely include content items. For example, the search can be based on folders known to be used by content management applications to store content items. Upon identifying content items, an import interface can be presented to the user that enables the user to select whether to proceed with the import. Further, the import interface can enable the user to select import parameters such as the type of import and which content items to import. A user can be enabled to select a subset of content items based on a variety of gathered metadata associated with the content items.

12 Claims, 6 Drawing Sheets

IMPORTING CONTENT ITEMS

CROSS REFERENCE TO RELATED APPLICATIONS

This application claims priority to U.S. provisional application No. 61/819,338, filed on May 3, 2013, which is expressly incorporated by reference herein in its entirety.

TECHNICAL FIELD

The present technology pertains to synchronized content item storage, and more specifically pertains to importing content items to a content management system.

BACKGROUND

Cloud storage accounts allow users to store their content items in an online storage account that can be accessed from any computing device with a network connection. Users can thus upload content items such as pictures, songs, documents, etc. from a computing device to their online storage account and later access the content items from different computing devices.

While online storage accounts allow users to easily access their uploaded content items, uploading the content items themselves can be time consuming. Users often have content items stored in various folders on their computing device. For example, content items such as photographs may be stored in a photos folder associated with a photo management application installed on the computing device. Other content items such as songs, documents, etc. may be similarly situated in folders associated with an application used to manage the content items. As a result, it may be difficult for a user to locate all the content items on their computing device to upload to their online storage account as well as update their online storage account when new content items are stored or modified on their computing device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for importing content items to a content management system. A content library can be synchronized across a client device and a content management system. The client device can include a designated synchronization folder that is synchronized with content stored on the content management system and assigned to an associated account. Modifications made to the designated synchronization folder such as, adding, modifying deleting, etc., content items stored in the designated synchronization folder can be synchronized with the content management system. A user can thus add content items to the designated synchronization folder and the content item can be synchronized with the content management system by, for example, being uploaded to the content management system and assigned to an associated user account.

In some instances, a user may have content items stored on their client device in a location other than within the designated synchronization folder. For example, the user may use a content management application, such as iPhoto® or iTunes® applications by Apple Inc. of Cupertino, Calif., to manage their content items, which stores the content items in a location other than the designated synchronization folder. The client device can be configured to identify the location of these content items by searching the memory of the client device for files associated with specified file extensions indicating that the file is a content item.

In some embodiments, the client device can perform a complete search of accessible storage, such as a local hard drive, to identify the location of content items. Alternatively, in some embodiments, the client device can perform a search of folders or directories that are likely to include content items. For example, the client device can search folders known to be used by common content management applications to store content items.

Upon identifying the location of content items in memory, the client device can import the content items to the content management system. In some embodiments, this can include creating a copy of the content items, which are then stored in the designated synchronization folder, resulting in the content items being synchronized with the content management system. Alternatively, in some embodiments, the content items can be uploaded to the content management system directly from the identified location, without copies of the content items being stored in the designated synchronization folder.

In some instances, the user may have a large content library and thus available storage space on the client device and/or the associated account on the content management system can become an issue. The client device can thus determine the size of the content items at the identified location(s) and determine the available storage space on the client device and/or the associated account on the content management system. The client device can then condition importing the content items based on the determined available storage.

In some embodiments, the client device can be configured to notify the user of the size of the identified content items and the available space on the client device and/or in the associated account on the content management system. The client device can further enable a user to select a subset of the content items to import. In some embodiments, the client device can gather metadata associated with the content items and enable the user to select a subset of the content items based on the metadata. For example, the user can select a subset of the content items by selecting specified albums, creation dates, locations, etc., associated with the content items.

Further, the client device can associate the gathered metadata with the content items imported to the content management system. In some embodiments, the client device can associate the metadata directly with the content items by appending the metadata to the content item. Alternatively, in some embodiments, the client device can assign a unique content item identifier to each content item and store the metadata associated with the content items in a metadata index. The metadata index can identify the content item associated with the metadata using the unique content item identifier.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
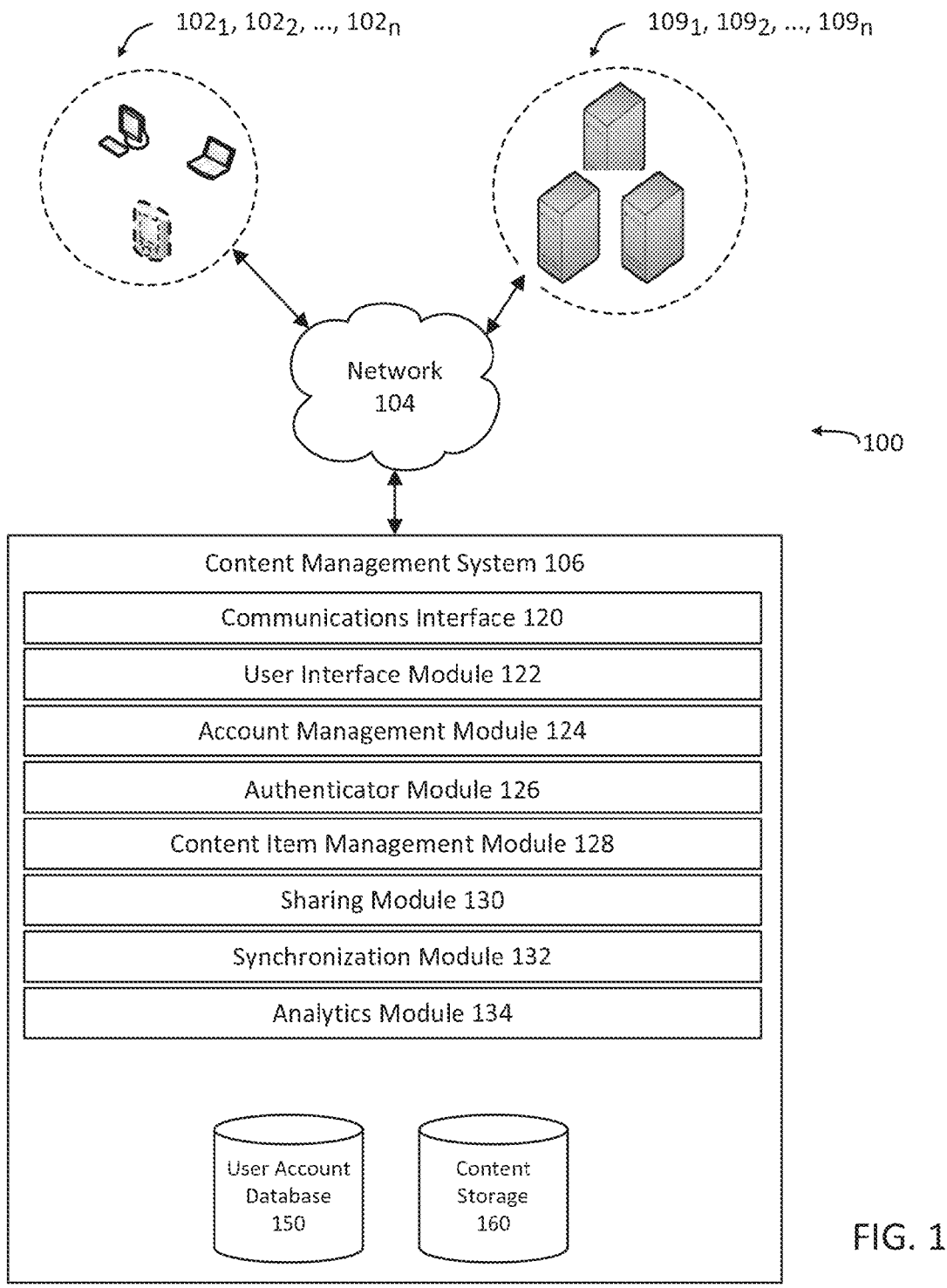
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a technique to automatically identify content items to import to a content management system. A content library can be synchronized across a client device and a content management system. The client device can include a designated synchronization folder that is synchronized with content stored on the content management system and assigned to an associated account. Modifications made to the designated synchronization folder such as, adding, modifying deleting, etc., content items stored in the designated synchronization folder can be synchronized with the content management system. A user can thus add content items to the designated synchronization folder and the content item can be synchronized with the content management system by, for example, being uploaded to the content management system and assigned to an associated user account.

In some instances, a user may have content items stored on their client device in a location other than within the designated synchronization folder. For example, the user may use a content management application, such as iPhoto® or iTunes® applications developed by Apple Inc. of Cupertino, Calif., to manage their content items, which stores the content items in a location other than the designated synchronization folder. The client device can be configured to identify the location of these content items by searching the memory of the client device for files associated with specified file extensions indicating that the file is a content item.

In some embodiments, the client device can perform a complete search of memory to identify the location of content items. Alternatively, in some embodiments, the client device can perform a search of folders or directories that are likely to include content items. For example, the client device can search folders known to be used by common content management applications to store content items.

Upon identifying the location of content items in memory, the client device can import the content items to the content management system. In some embodiments, this can include creating a copy of the content items which are then stored in the designated synchronization folder, resulting in the content items being synchronized with the content management system. Alternatively, in some embodiments, the content items can be moved to the designated synchronization folder where they are then synchronized with the content management system.

In some instances, the user may have a large content library and thus available storage space on the client device and/or the associated account on the content management system can become an issue. The client device can thus determine the size of the content items at the identified location(s) and determine the available storage space on the client device and/or the associated account on the content management system. The client device can then condition importing the content items based on the determined available storage.

In some embodiments, the client device can be configured to notify the user of the size of the identified content items and the available space on the client device and/or in the associated account on the content management system. The client device can further enable a user to select a subset of the content items to import. In some embodiments, the client device can gather metadata associated with the content items and enable the user to select a subset of the content items based on the metadata. For example, the user can select a subset of the content items by selecting specified albums, creation dates, locations, etc., associated with the content items.

Further, the client device can associate the gathered metadata with the content items imported to the content management system. The metadata can then be used when presenting the content items to a user. For example, the metadata can be used to organize or group the content items based on creation date, album, playlist, etc. Alternatively, the user can select display options based on the available metadata.

In some embodiments, the client device can associate the metadata directly with the content items by appending the metadata to the content item. Alternatively, in some embodiments, the client device can assign a unique content item identifier to each content item and store the metadata associated with the content items in a metadata index. The metadata index can identify the content item associated with the metadata using the unique content item identifier.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, . . . , $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices.

Client devices 102 can be of varying type, capabilities, operating systems, etc. Furthermore, content management system 106 can concurrently accept connections from and interact with multiple client devices 102.

A user can interact with content management system 106 via a client-side application installed on client device 102$_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device 102$_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device 102$_i$ can upload content to content management system 106 via network 104. The content can later be retrieved from content management system 106 using the same client device 102$_i$ or some other client device 102$_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device 102$_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102$_i$ can include client software, which synchronizes, via a synchronization module 132 at content management system 106, content in client device 102$_i$'s file system with the content in an associated user account. In some cases, the client software can synchronize any changes to content in a designated synchronization folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device 102$_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers 109$_1$, 109$_2$, ..., 109$_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 and client devices 102 are presented with specific components, it should be understood by one skilled in the art, that the architectural configuration presented is simply one possible configuration and that other configurations with more or less components are also possible. For example, in some embodiments, client devices 102 can be configured to locate and import content items to content management system 106.

Figure 2:
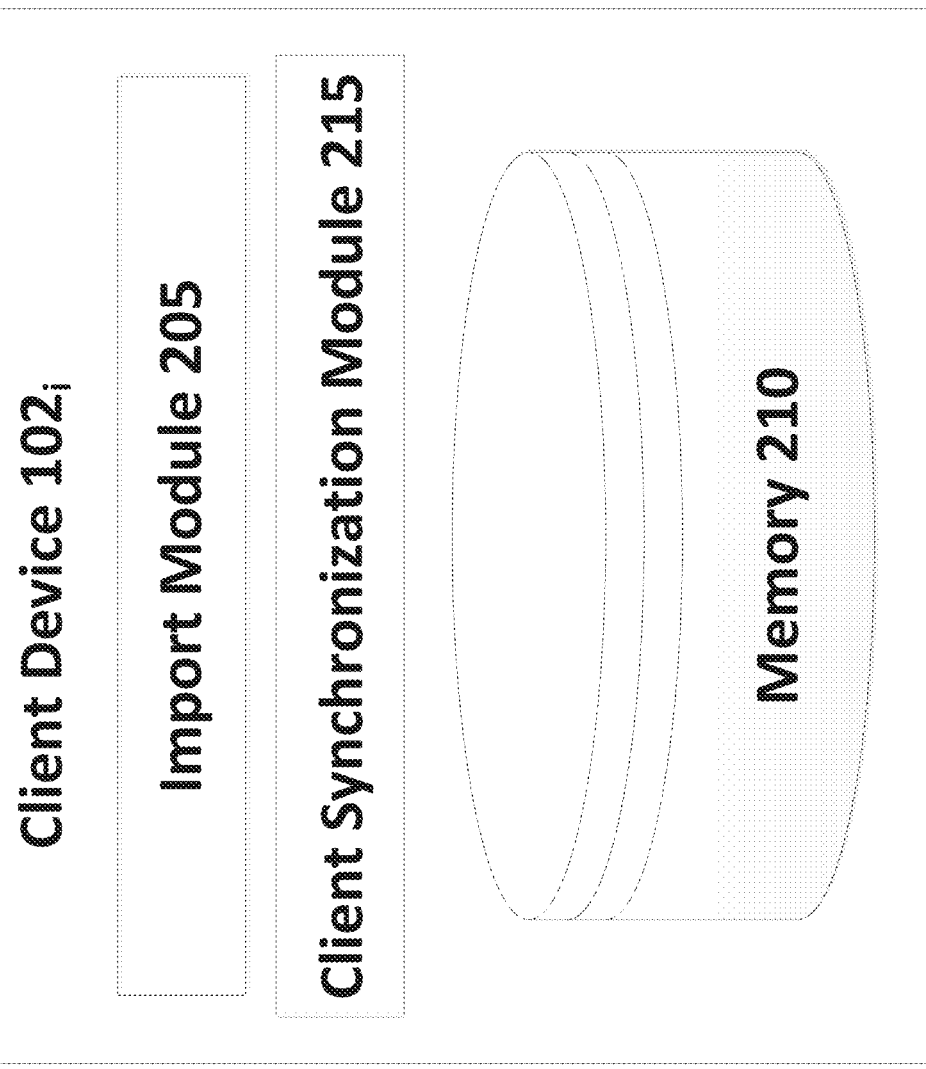
FIG. 2 shows an exemplary embodiment of a client device configured to import content items to a content management system.

FIG. 2 shows an exemplary embodiment of client device $102_i$ configured to import content items to content management system 106. As shown, client device $102_i$ can include import module 205. Import module 205 can be configured to identify the location of content items stored on client device $102_i$ that are unknown to content management system 106.

In some embodiments, content management system 106 can be configured to synchronize, via synchronization module 132, content items stored on client device $102_i$ with content items stored on content management system 106 and assigned to an associated user's account. In some embodiments, client device $102_i$ can include client synchronization module 215 configured to monitor a designated synchronization folder and any sub-folders on client device $102_i$ and synchronize any changes to the designated synchronization folder with content management system 106. Thus, modification made to the designated synchronization folder, such as adding or modifying a content item, can be detected by client synchronization module 215 and synchronized with content management system 106. While content items stored in the designated synchronization folder are not necessarily uploaded to content management system 106, content management system 106 is made aware of the content items stored in the designated synchronization folder.

In some embodiments, however, content items not stored in the designated synchronization folder are unknown to content management system 106. For example, synchronization module 215 can be configured to have limited access to monitor and synchronize only the content items stored within the designated synchronization folder and any subfolders. Thus, to synchronize content items stored on client device $102_i$ with content items stored on content management system 106 and assigned to an associated user account, a user must store the content items in the designated synchronization folder on client device $102_i$.

A user can manually identifying content items stored on client device $102_i$ and move the content items to the designated synchronization folder, however, import module 205 can be configured to automatically perform this process. For example, import module 205 can be configured to identify the location of content items on client device 102 that are not stored in the designated synchronization folder and import the content items stored at the identified location to content management system 106. This can include creating copies of the content items which are then stored in the designated synchronization folder, so that they can be synchronized with content management system 106. Alternatively, in some embodiments, the content items can be moved from the identified location to the designated synchronization folder where they can then be synchronized with the content management system.

To identify the location of content items on client device $102_i$, in some embodiments, import module 205 can be configured to search for a set of specified file extensions. For example, to identify the location of content items such as photographs and image files, import module 205 can be configured to search for files associated with file extensions indicating that the file is a photograph or image file, such as .gif, .jpeg, .png, etc. Alternatively, to identify the location of content items such as documents, import module 205 can search for files associated with common document file extensions such as .pdf, .txt, .doc, etc.

In some embodiments, import module 205 can be configured to perform a full search of client device $102_i$ to identify content items. For example, client device $102_i$ can include memory 210 and import module 205 can be configured to search all directories and folders in memory 210, other than the designated synchronization folder, to identify the location of content items.

While effective, performing a full search of memory 210 to identify the location of content items can be time consuming. Thus, in some embodiments, import module 205 can be configured to use a heuristic based method of searching for the location of content items on client device $102_i$. For example, import module 205 can be configured to limit the search to locations most likely to include content items.

Many users use content management applications, such as Apple's iPhoto® and iTunes®, to manage their various types of content items. These types of content management applications often store content items in a content library folder associated with the content management application. Thus, in some embodiments, import module 205 can be configured to search for library folders associated with common content management applications to identify the location of content items stored on client device $102_i$. For example, in some embodiments, import module 205 can have access to a list of common content management applications as well as folder names and folder hierarchies associated with the various content management applications. Import module 205 can use the data on the list to search memory 210 for the listed folders to identify the location of content items stored on client device $102_i$.

Alternatively, in some embodiments, import module 205 can be configured to search client device $102_i$ for common content management applications. Import module 205 can then search the folders associated with the detected content management applications.

In some embodiments, import module 205 can be configured to determine the operating system running on client device $102_i$ and search for folders associated with a content management application based on the determined operating system. For example, if import module 205 determines that client device $102_i$ is running an Apple operating system, import module 205 can search for folders associated with common Apple content management applications such as iPhoto® and iTunes®.

Upon identifying a folder likely to store content items, import module 205 can be configured to scan the folder for content items based on the file extension of the files stored in the identified folder. If a determination is made that the folder does include content items, import module 205 can identify the folder as a location storing content items. Import module 205 can then import the content items stored in the identified locations to content management system 106. Further, the identified location can be stored in memory 210 and used by import module 205 to identify content items in the future.

In some embodiments, importing the content items can include creating a duplicate of the content items, which are then stored in the designated synchronization folder where they can be synchronized with client device 106 by client synchronization module 215. This would result in a duplicate of each of the content items being stored on client device $102_i$. Thus the original content item would remain in the identified folder and a copy of the content item can be stored in the designated synchronization folder.

By copying the content items to the designated synchronization folder, the synchronization process can be either a one way or two way process. A one way process means that the content items can be synchronized from the client device to the content management system 106, however content management system 106 cannot write to the identified folder. Thus, if content items associated with a content management application are found, copies of the content items are stored in the designated synchronization folder. The content items can then be synchronized with content management system 106, but content management system 106 cannot write to the identified folder to, for example, add new content items or modify existing content items. Thus, content items on content management system 106 will not be synchronized with the content management application on client device $102_i$. This creates a one way synchronization process where the content items stored by the content management application are synchronized with content management system 106, however the content items stored on content management system 106 are not synchronized back to the content management application.

Alternatively, in some embodiments, the synchronization process can be a two way process. For example, if a content item uploaded to content management system 106 is accessed by a second client device and modified, the modified version can be synchronized with content management system 106 and then with client device $102_i$. Thus the content item on client device $102_i$ can be modified or replaced to reflect the modifications made on the second client device. This can include modifying both the copy of the content item in the designated synchronization folder and/or the original content item in the identified location. Further, in some embodiments, copies of the content items in the designated synchronization folder can be stored in the identified folder so that they can be accessed using a content management application. Further, in some embodiments, the content management application can be given access to content items in the designated synchronization folder. Thus, synchronization will be a two way process because content management system 106 will be synchronized with the content management application and the content management application will be synchronized with content management system 106.

Alternatively, in some embodiments, the content items can be moved from the identified location to the designated synchronization folder where they are then synchronized with the content management system 106. In this type of embodiment, the synchronization process can be a two way process because the content items will be synchronized with content management system 106 and vice versa. Further, if the content items were associated with a content management application, in some embodiments, the content management application can be given access to the content items in the designated synchronization folder. Thus the content management application can present all the content items assigned to the user's account.

In some embodiments, import module 205 can be configured to determine the amount of available storage space in the associated account on content management system 106 and/or on client device $102_i$, prior to importing content items. In some instances, a user may have a large content library and thus available storage on content management system 106 and/or client device $102_i$ can become an issue. For example, a user may have a limited amount of available storage space on content management system 106 and the user's content library may take up a substantial portion of or exceed the available storage space available to the user on content management system 106. Further, storage on client device $102_i$ may be limited and thus creating a copy of the content items to be stored in the designated synchronization folder may take up a substantial portion of or exceed the available storage on client device $102_i$. Alternatively, client device $102_i$ and/or the associated account on content management system 106 may have ample available space, however the user may wish to minimize the storage used.

To account for these possible issues, import module 205 can be configured to determine the size of the content items and the available storage space on client device $102_i$ and/or the associated account on content management system 106. In some embodiments, import module 205 can scan the content items in the identified location(s) to determine the size of the content items. Alternatively, in some embodiments, import module 205 can use metadata associated with the content item that indicates the file size of the content item to determine the size of the content items.

To determine the available space in the associated account on content management system 106, in some embodiments, import module 205 can be configured to transmit a message to content management system 106 requesting the available storage space in the associated account on content management system 106. Alternatively, in some embodiments, metadata indicating the available storage space in the associated account on content management system 106 can be stored on client device $102_i$, for example, in the designated synchronization folder. Import module 205 can thus access the metadata stored in the synchronization folder to determine the available storage space in the associated account.

Import module 205 can be configured to condition importing the content items based on a determination of the available storage space and the size of the content items. In some embodiments, import module 205 can be configured to import the content item only when it is determined that there is adequate available storage for the import. For example, this can include a determination that the available storage space on client device $102_i$ and/or the associated account on content management system 106 is at least equal to the size of the content items.

Alternatively, in some embodiments, this can include a determination that a predetermined amount of available space will be left on client device $102_i$ and/or the associated account on content management system 106 after the content item are imported. For example, importing the content items can be conditioned on at least 5 GB of available storage space remaining on client device $102_i$ and/or the associated account on content management system 106 after the content items are imported.

Alternatively, importing the content items can be conditioned on a predetermined percentage of the total storage space on client device $102_i$ and/or the associated account on content management system 106 remaining after the import. For example, importing the content items can be conditioned on at least 10% of the total storage space on client device $102_i$ and/or the associated account on content management system 106 remaining after the content item are imported.

In some embodiments, the conditions can be different for client device $102_i$ and the associated account on content management system 106. For example, importing the content items can be conditioned on at least 20% of the total storage remaining on client device $102_i$ and 10% of the total available storage remaining in the associated account on content management system 106 after the content items are imported.

Alternatively, in some embodiments, import module 205 can be configured to condition the type of import based on the determined available storage space on client device $102_i$ and/or in the associated account on content management system 106. For example, if it is determined that there is adequate available storage space in the associated account on content management system 106 to import the content items, but there is not adequate available storage space on client device $102_i$, import module 205 can be configured to move the content items to the designated synchronization folder upload to content management system 106 without creating copies. Alternatively, if it is determined that there is adequate storage space on both client device $102_i$ and the associated account on content management system 106, import module 205 can be configured to create a copy of the content items, which are stored in the designated synchronization folder and synchronized with content management system 106.

In some embodiments, import module 205 can be configured to identify any content items in the identified location that are duplicates. For example, import module 205 can scan the content items using any known method in the art to determine if content items are duplicates. If multiple content items in the identified location(s) are determined to be duplicates of each other, import module 205 can be configured to import only one of the content items identified to be duplicates of each other. Thus, only one copy of each unique content item can be imported to content management system 106. Further, the size of the content items can be the size of the content items without including any duplicate content items that will not be imported.

Further, in some embodiments, import module 205 can be configured to identify any of the content items in the identified location that are a duplicate of a content item already stored in the designated synchronization folder and/or in the associated account on content management system 106. Import module 205 can be configured to not include any content items determined to be a duplicate of a content item stored in the designated synchronization folder and/or the content management system, as part of the import. Thus, the content items determined to be a duplicate will not be imported to content management system 106. Further, the determined size of the content items can be the size of the content items excluding the identified duplicate content items.

In some embodiments, import module 205 can be configured to notify the user of the size of the content items and the determined available storage space on client device $102_i$ and in the associated account in content storage system 106. For example, import module 205 can be configured to present an import interface on a display of client device $102_i$ that indicates the size of the content items and the available storage space on client device $102_i$ and in the associated account in content storage system 106.

In some embodiments, import module 205 can be configured to receive confirmation from the user prior to proceeding with the import. For example, import interface can include a user interface element, such as a button, which the user can select to proceed with the import. Additionally, the import interface can include a second user interface element, such as a button, which the user can select to cancel the import.

In some embodiments, import module 205 can be configured to enable a user to select parameters for the import. In some embodiments, import module 205 can be configured to enable a user to select the type of import. For example, the import interface can prompt a user to select between importing the content items to content management system 106 by moving the content items to the designated synchronization folder or by creating a copy of the content items that will be stored to the designated synchronization folder.

In some embodiments, import module 205 can be configured to enable a user to select a subset of the content items to be imported. For example, the import interface can present a list of the content items and a user can select the content items to be imported.

Alternatively, in some embodiments, import module 205 can be configured to enable a user to select a subset of the content items based on metadata associated with the content items. For example, import module 205 can be configured to gather metadata associated with the content items and use the metadata to enable a user to select a subset of the content items. Metadata associated with the content items can be any type of data describing the content items such as the location at which the content item was created, the day and time the content item was created, the client device used created the content item, the type of client device used to create the content item, the content item type, author, user feedback, artist, tagged individuals, artist album, photograph album, playlist, latest modification time, access history, etc.

The import interface can enable a user to select a subset of the content items based on the gathered metadata associated with the content items. For example, import interface can enable a user to select a subset of content items created during a specified time range, belonging to a specified photograph album, including specified tagged individuals, etc. Further, the import interface can present the size of the subset of content items selected by the user. The user can thus easily select the content items to be imported based on a variety of available criteria, while also being made aware of the amount of available storage necessary to import the selected items.

In some embodiments, import module 205 can gather the metadata from the content items themselves. For example, the metadata can be appended to the content items and import module 205 can gather the appended metadata. Alternatively, in some embodiments, the metadata can be gathered from a metadata file associated with the content items.

In some embodiments, the gathered metadata can be imported along with the content items. For example, the metadata can be associated with the imported content items such that, when the content item is accessed from a second client device, the metadata is available to the second client device. This can include metadata used to display the content items in a correct organization structure, such as in an album, playlist, or other collection, as well as metadata describing the content item itself. For example, the metadata can be used to present the content items to a user in the same collections as they were presented by the content management application. Thus a user can access the content items from a second client device and the content items will be presented in the same manner as they would be presented by the content management system, including organized by albums, playlists, events, locations, etc.

Alternatively, the metadata can be used to present the content items in a different grouping, order, or collection based on the metadata. In some embodiments, the metadata can be used to enable a user to select the grouping in which the content items are presented. For example, the user can select to group content items based on album, location, date, event, genre, etc.

To import metadata along with a content item, in some embodiments, the metadata can be associated with the content item directly. For example, the metadata can be appended to the content item such that the metadata can be accessed directly from the content item. While effective, this method can have some undesirable results. For one, any user with access to the content item may be able to access the metadata. Further, creating a duplicate of the content item can result in a content item associated with the same metadata as the previous content item. This can include creation time, location, etc. Thus the metadata can be inaccurate.

Accordingly, in some embodiments, a unique content item identifier can be assigned to each imported content item and used to associate the content item with metadata. For example, the metadata can be stored in a metadata index that includes metadata associated with content items as well as the unique content item identifier assigned to the content items. Thus, the unique content item identifier assigned to a content item can be used to search the metadata index to locate the metadata associated with the content item.

In some embodiments, the unique content item identifier assigned to a content item can be appended to the content item. Thus, to access the metadata associated with a content item, the unique content identifier can be retrieved from the content item itself and used to search the metadata index.

Alternatively, in some embodiments, the unique content item identifier can be created from the content item itself. For example, the content item, or a part thereof, can be used as input to a hashing algorithm that outputs the unique content item identifier for the content item. Thus, to access the metadata associated with the content item, the content item itself can be used along with the hashing algorithm to derive the unique content item identifier assigned to the content item. The unique content item identifier can then be used to search the metadata index to access the metadata associated with the content item.

In this type of embodiments, the metadata index can be created and stored on client device $102_i$, for example, in the designated synchronization folder. The metadata index can then be uploaded to content management system 106.

Alternatively, in some embodiments, an album identifier can be associated with each content item to identify an album that the content item belongs to. For example, content items such as photographs and music can belong to an album and can be associated with metadata identifying the album the content item belongs to. In some embodiments, metadata identifying the albums of the content items to be imported can sent to content management system 106. Content management system 106 can use the received metadata to create an album identifier for each of the albums. The album identifiers can be returned to client device $102_i$ where they can be associated with each content item. For example, in some embodiments, the album identifier can be appended to each content item. Alternatively, the album identifier can be associated with the content item using the metadata index. The album of an uploaded content item can then be determined using the album identifier associated with the content item.

Figure 3:
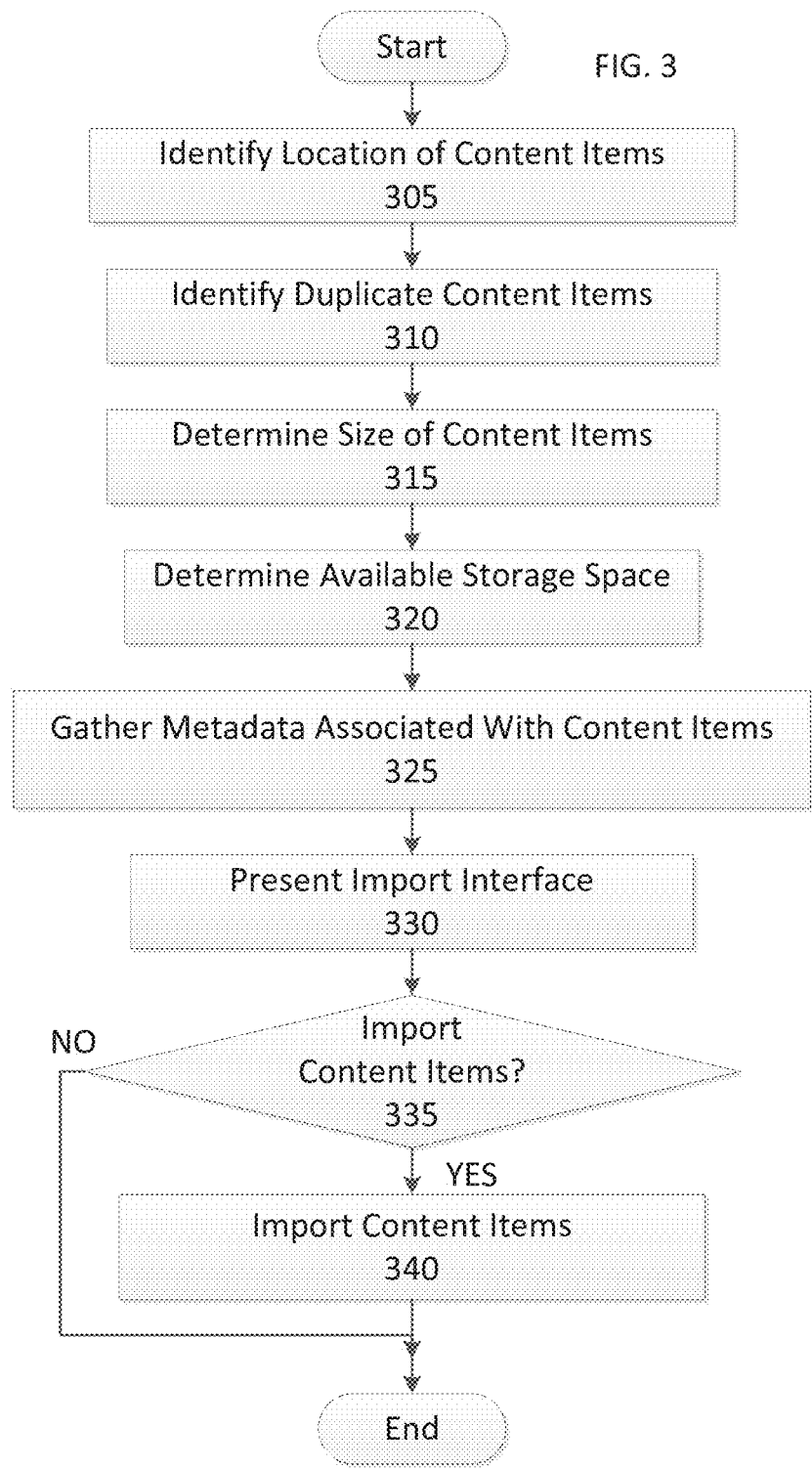
FIG. 3 shows an exemplary embodiment of importing content items to a content management system from a client device.

FIG. 3 shows an exemplary embodiment of importing content items to a content management system from a client device. Although specific steps are show in FIG. 3, in other embodiments the method can have more or less steps. As shown, the method begins at block 305 where the location of content items is identified on the client device. This can be accomplished using a variety of methods, including the method shown in FIG. 4.

Upon identifying the location of content items, the method continues to block 310 where the content items stored at the identified location are scanned to identify any duplicates. This can include identifying two or more content item stored in the identified location that are duplicates of each other. Further this can include identifying any content item stored in the identified location that is a duplicate of a content item stored in a designated synchronization folder on the client device and/or a content item stored on the content management system.

The method then continues to block 315 where the size of the identified content items is determined. This can include the total size of all of the content items not including any identified duplicate content items. Thus the size can take into account one of each unique content item in the identified location that is not a duplicate of a content item stored in the designated synchronization folder and/or the content management system.

The method then continues to block 320 where the available storage on the client device and an associated account on the content management system are determined. The method then continues to block 325 where metadata associated with the content items can be gathered. For example, the metadata can be gathered from the content items themselves or an associated metadata file.

The method then continues to block 330 where an import interface is presented to the user. The import interface can be an interface that notifies the user that content items have been located on the client device that can be imported to the content management system. Further, the import interface can present the user with metadata regarding importing the content items. For example, the import interface can include the file size of the content items, the available storage space on the client device and the associated account on the content management system, and any metadata describing the content items, including name, location, individual size, type, album, playlist, collection, artist, etc.

Further, in some embodiments, the import interface can enable a user to customize the import of the content items. For example, the user can select to import the content items directly to the content management system without creating copies that are stored in the designated synchronization folder on the client device by having the import module move the content items from their original location to the synchronization folder. Alternatively, the user can select to have copies of the content items created and stored in the designated synchronization folder.

Further, in some embodiments, the import interface can enable a user to select a subset of the content items to be imported. For example, the import interface can enable a user to select a subset based on metadata gathered regarding the content items, such as creation date and time, location, album, playlist, tagged individuals, type, genre, artist, author, etc.

The import interface element can also enable a user to select whether to import the content items. For example, the user can select to cancel the import. Alternatively, the user can select to import the content items, or any subset of content items selected by the user.

At block 335, the method determines whether the user selected to import content items. If the user did not select to import content items, the method ends. Alternatively, if the user did select to import content items, the method continues to block 340 where the selected content items are imported to the content management system. In some embodiments, the content items can be imported using the method shown in FIG. 5.

Figure 4:
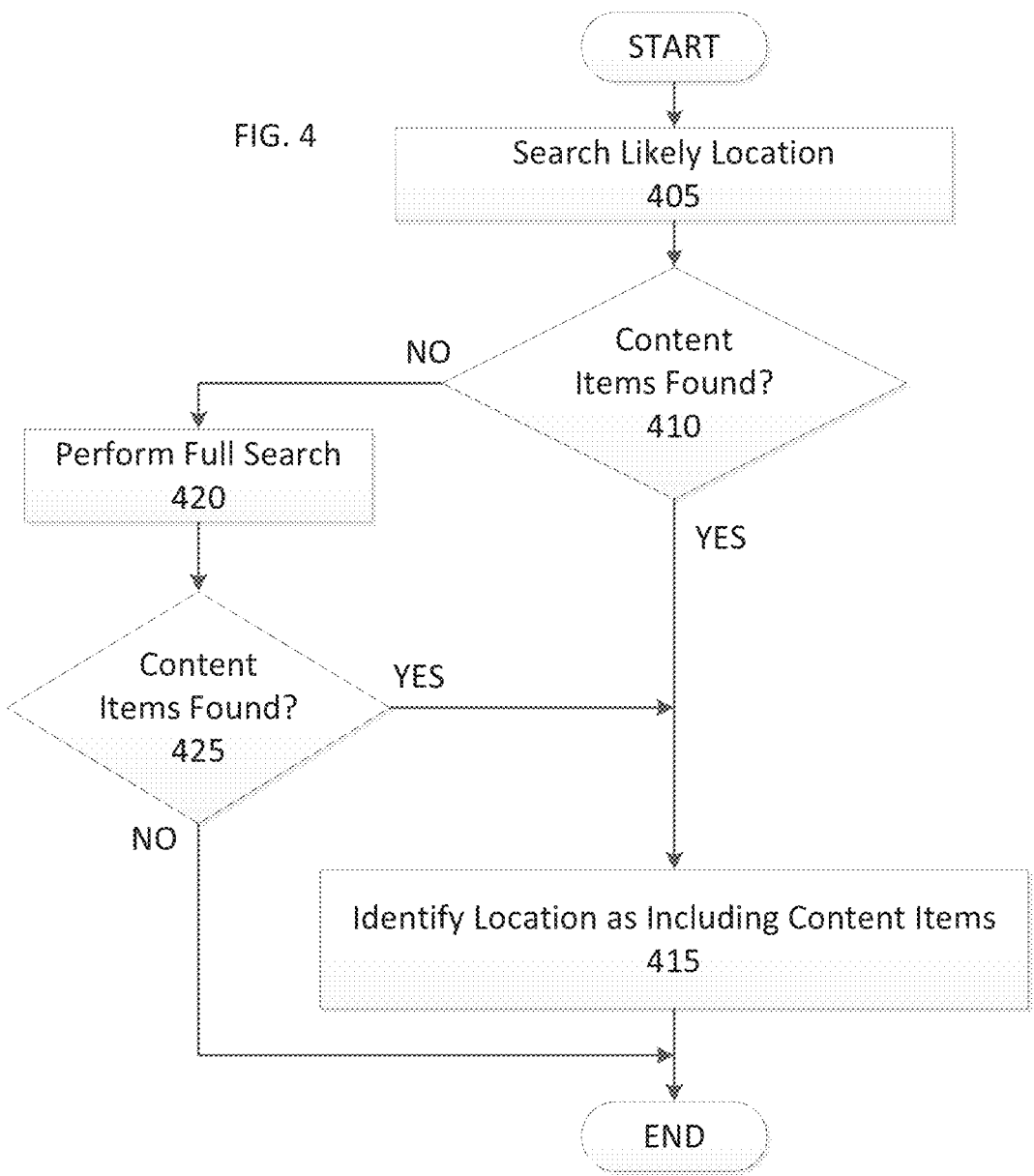
FIG. 4 shows an exemplary method embodiment of identifying the location of content items on a client device.

FIG. 4 shows an exemplary method embodiment of identifying the location of content items on a client device.

Although specific steps are show in FIG. 4, in other embodiments the method can have more or less steps. As shown the method begins at block 405 where locations likely to include content items are searched. This can include folders known to be used by content management applications to store content items. The folders can be searched for files associated with specified file extension. For example, the folders can be searched for files associated with file extensions that indicate that the file is a content item such as an image file or photograph. This can include file extensions such as .gif, .jpeg, .png, etc.

The method then continues to block 410 where it is determined if content items are found at the locations. If content items are found, the method continues to block 415 where any location at which content items were found is identified as a location including content items and the method ends.

Alternatively, if at block 410 it is determined that the location(s) do not include content items, the method continues to block 420 where a full search of the client device is performed. This can include searching for content items in all folders and directories on the client device that have not yet been searched. Further, in some embodiments, the full search can exclude searching a designated synchronization folder on the client device.

In some embodiments, the full search can be performed only a single time because of the time required to perform a full search. For example, any locations identified as including content items can be saved and thus the full search can be used initially to identify those locations. In some embodiments, the full search can be limited based on time. For example, the full search is limited to being performed once a month or once every six months. In some embodiments, the full search will be performed automatically the first time and then the user will be prompted as to whether they would like to perform a full search any subsequent times. In some embodiments, the full search can be performed a minimum amount of times per a time period. For example, the full search can be performed at least once a year to identify any unknown content items. In some embodiments, the full search can be performed even if content items are found at a likely or known location. This can be done to periodically check for any new and unknown locations that include content items.

The method then continues to block 425 where it is determined if content items were found. If no content items were found the method ends. Alternatively, if content items were found, the method continues to block 415 where any location where content items were found is identified as including content items. The method then ends.

Figure 5:
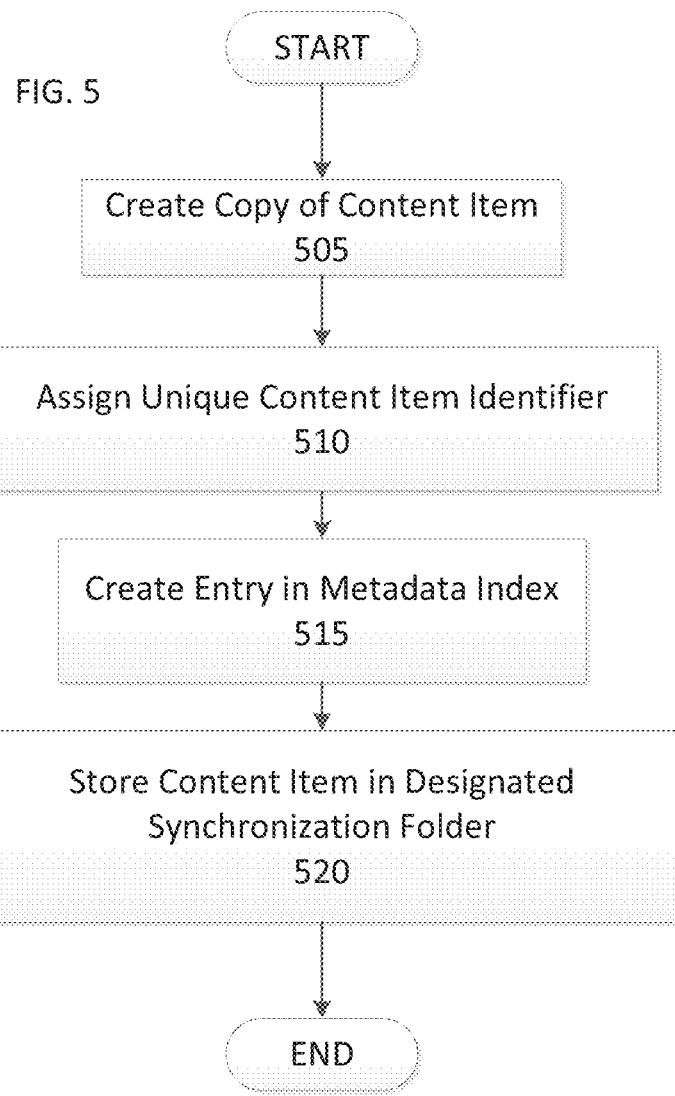
FIG. 5 shows an exemplary embodiment of importing a content item.

FIG. 5 shows an exemplary embodiment of importing a content item. Although specific steps are show in FIG. 5, in other embodiments the method can have more or less steps. As shown, the method begins at block 505 where a copy of the content item is created. The method then continues to block 520 where a unique content item identifier is assigned to the copy of the content item. The unique content item identifier can be used to uniquely identify the content item from other content items, including the content item from which the copy of the content item was created.

The method then continues to block 515 where an entry for the copy of the content item is created in a metadata index. The entry can include the unique identifier assigned to the copy of the content item as well as any metadata gathered regarding the content item.

The method then continues to block 520 where the copy of the content item is stored in the designated synchronization folder. The method then ends.

Figure 6A:
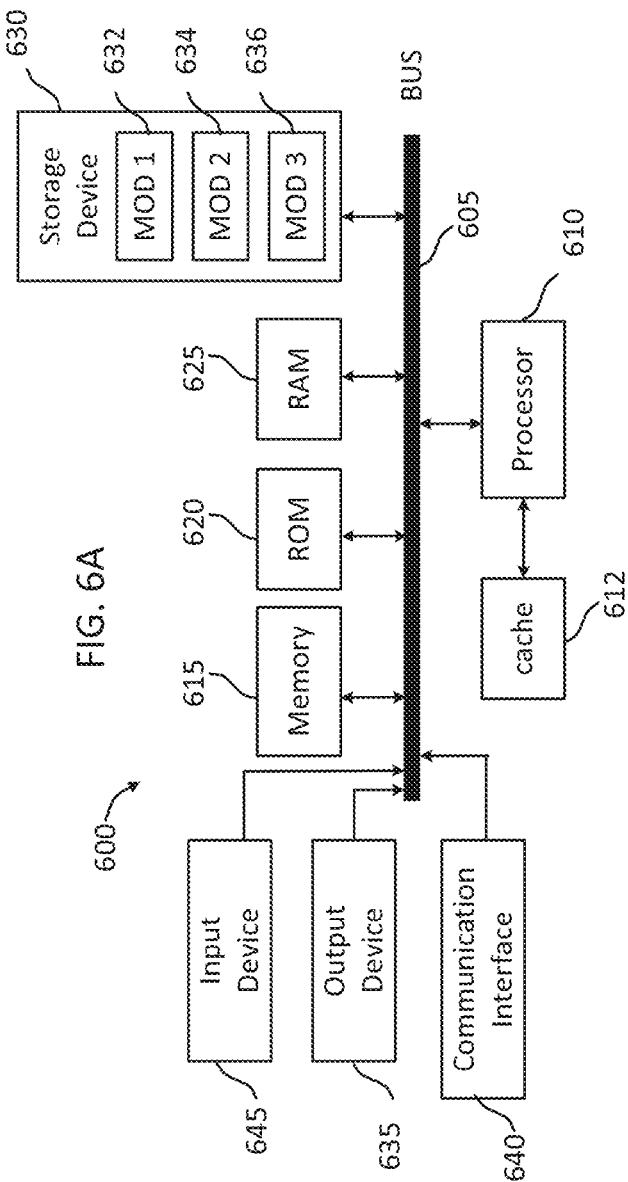
FIGS. 6A and 6B show exemplary possible system embodiments.
Figure 6B:
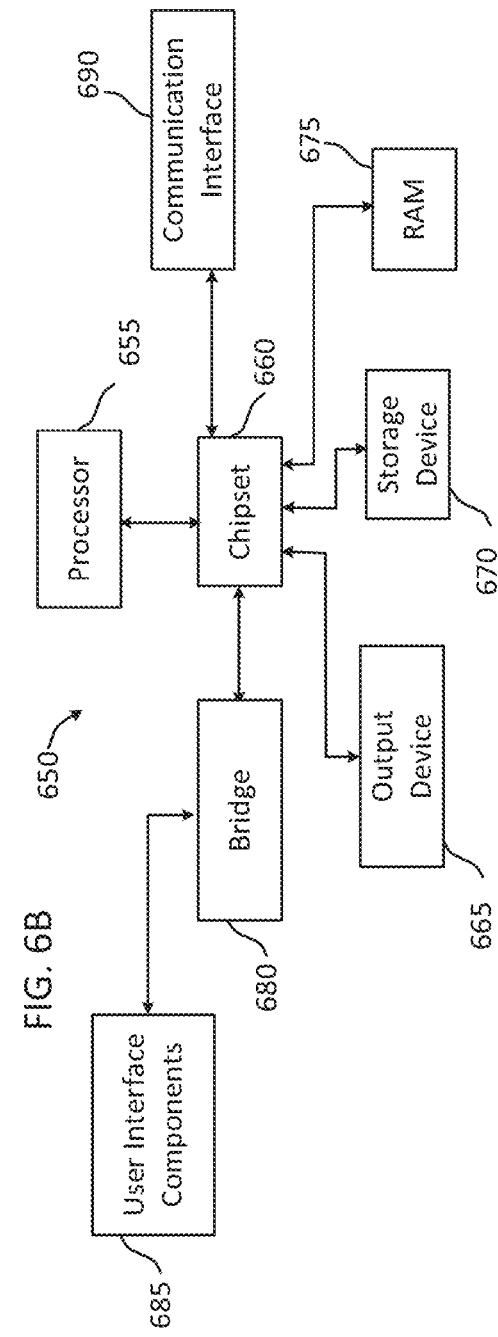

FIG. 6A, and FIG. 6B show exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
    identifying, by a processor, a file in a first directory on a client device;
    determining, by the processor, that the file is a content item when the file includes a predetermined file extension;
    creating a duplicate of the content item;
    determining if the duplicate of the content item is a duplicate of a content item stored in a synchronization folder on the client device;
    storing the duplicate of the content item in the synchronization folder on the client device after a determination that the duplicate of the content item is not stored in the synchronization folder, wherein the synchronization folder is a folder associated with a content management application;
    determining if the duplicate of the content item in the synchronization folder is a duplicate of a content item stored in an associated account in a content management system; and
    importing, by the processor, the duplicate of the content item in the synchronization folder to the associated account of the content management system associated with the content management application after a determination that the duplicate of the content item in the synchronization folder is not a duplicate of a content item stored in the associated account of the content management system.

2. The method of claim 1, further comprising:
identifying the content management application installed on the client device;
wherein identifying the content management application comprises:
identifying an operating system running on the client device; and
determining that the content management application associated with the operating system is installed on the client device.

3. The method of claim 1, further comprising:
determining a size of the duplicate of the content item in the synchronization folder; and
determining an amount of available space in the associated account, wherein the duplicate of the content item in the synchronization folder is imported upon a determination that there is sufficient available space in the associated account for the duplicate of the content item in the synchronization folder.

4. The method of claim 3, wherein it is determined that there is sufficient available space in the associated account when the amount of available space in the associated account is at least equal to the size of the duplicate of the content item in the synchronization folder.

5. A client device comprising:
a processor; and
a memory containing instructions that, when executed, cause the processor to:
identify a file in a first directory on the client device;
determine that the file is a content item when the file includes a predetermined file extension;
create a duplicate of the content item;
determine if the duplicate of the content item is a duplicate of a content item stored in a synchronization folder on the client device;
store the duplicate of the content item in the synchronization folder on the client device after a determination that the duplicate of the content item is not stored in the synchronization folder, wherein the synchronization folder is a folder associated with a content management application;
determine if the duplicate of the content item in the synchronization folder is a duplicate of a content item stored in an associated account in a content management system; and
import the duplicate of the content item in the synchronization folder to the associated account on the content management system associated with the content management application upon a determination that the duplicate of the content item in the synchronization folder is not a duplicate of a content item stored in the associated account.

6. The client device of claim 5, wherein the instructions further cause the processor to identify the content management application installed on the client device;
wherein identifying the content management application comprises:
identifying an operating system running on the client device; and
determining that the content management application associated with the operating system is installed on the client device.

7. The client device of claim 5, wherein the instructions further cause the processor to:
determine a size of the duplicate of the content item in the synchronization folder; and
determine an amount of available space in the associated account, wherein the duplicate of the content item in the synchronization folder is imported upon a determination that there is sufficient available space in the associated account for the duplicate of the content item in the synchronization folder.

8. The client device of claim 7, wherein it is determined that there is sufficient available space in the associated account when the amount of available space in the associated account is at least equal to the size of the duplicate of the content item in the synchronization folder.

9. A non-transitory computer-readable medium containing instructions that, when executed by a client device, cause the client device to:
identify a file in a first directory on the client device;
determine that the file is a content item when the file includes a predetermined file extension;
create a duplicate of the content item;
determine if the duplicate of the content item is a duplicate of a content item stored in a synchronization folder on the client device;
store the duplicate of the content item in the synchronization folder on the client device after a determination that the duplicate of the content item is not stored in the synchronization folder, wherein the synchronization folder is a folder associated with a content management application;
determine if the duplicate of the content item in the synchronization folder is a duplicate of a content item stored in an associated account in a content management system; and
import the duplicate of the content item in the synchronization folder to the associated account on the content management system associated with the content management application upon a determination that the duplicate of the content item in the synchronization folder is not a duplicate of a content item stored in the associated account.

10. The non-transitory computer-readable medium of claim 9, wherein the instructions further cause the client device to identify the content management application installed on the client device;
wherein identifying the content management application comprises:
identifying an operating system running on the client device; and
determining that the content management application associated with the operating system is installed on the client device.

11. The non-transitory computer-readable medium of claim 9, wherein the instructions further cause the client device to:
determine a size of the duplicate of the content item in the synchronization folder; and
determine an amount of available space in the associated account, wherein the duplicate of the content item in the synchronization folder is imported upon a determination that there is sufficient available space in the associated account for the duplicate of the content item in the synchronization folder.

12. The non-transitory computer-readable medium of claim 9, wherein it is determined that there is sufficient available space in the associated account when an amount of available space in the associated account is at least equal to a size of the duplicate of the content item in the synchronization folder.

* * * * *